United States Patent
Niessner et al.

(10) Patent No.: US 9,845,374 B2
(45) Date of Patent: Dec. 19, 2017

(54) MONO VINYL AROMATIC CONJUGATED DIENE BLOCK COPOLYMER AND POLYMER COMPOSITION COMPRISING SAID BLOCK COPOLYMER AND A MONO VINYLARENE ACRYLATE COPOLYMER

(71) Applicant: INEOS STYROLUTION GROUP GMBH, Frankfurt (DE)

(72) Inventors: Norbert Niessner, Friedelsheim (DE); Christof Mehler, Dossenheim (DE); Konrad Knoll, Mannheim (DE); Thomas W. Cochran, Channahon, IL (US)

(73) Assignee: INEOS STYROLUTION GROUP GMBH (DE)

( * ) Notice: Subject to any disclaimer, the term of this patent is extended or adjusted under 35 U.S.C. 154(b) by 70 days.

(21) Appl. No.: 14/903,505

(22) PCT Filed: Jul. 7, 2014

(86) PCT No.: PCT/EP2014/064411
§ 371 (c)(1),
(2) Date: Jan. 7, 2016

(87) PCT Pub. No.: WO2015/004043
PCT Pub. Date: Jan. 15, 2015

(65) Prior Publication Data
US 2016/0168303 A1    Jun. 16, 2016

(30) Foreign Application Priority Data
Jul. 8, 2013  (EP) .................................. 13175483

(51) Int. Cl.
*C08L 53/00* (2006.01)
*C08F 293/00* (2006.01)
*C08F 297/04* (2006.01)
*C08L 25/14* (2006.01)

(52) U.S. Cl.
CPC ........ *C08F 293/005* (2013.01); *C08F 297/04* (2013.01); *C08L 25/14* (2013.01); *C08L 2201/08* (2013.01); *C08L 2205/06* (2013.01)

(58) Field of Classification Search
CPC .. C08F 293/005; C08L 25/14; C08L 2201/08; C08L 2205/06
USPC ...................................................... 524/505
See application file for complete search history.

(56) References Cited

U.S. PATENT DOCUMENTS

| | | | |
|---|---|---|---|
| 4,386,190 A * | 5/1983 | Bailey | C08L 25/14 525/901 |
| 4,939,208 A * | 7/1990 | Lanza | C08F 297/04 525/256 |
| 5,304,598 A * | 4/1994 | Custro | C08L 53/02 525/314 |
| 5,777,030 A | 7/1998 | Hanes et al. | |
| 6,031,053 A | 2/2000 | Knoll et al. | |
| 6,235,847 B1 * | 5/2001 | Hoshi | C08F 297/04 525/314 |
| 6,593,430 B1 | 7/2003 | Knoll et al. | |
| 7,776,965 B2 | 8/2010 | Wilkey et al. | |
| 2004/0132943 A1* | 7/2004 | Knoll | C08F 8/04 526/335 |
| 2005/0187344 A1 | 8/2005 | Wilkey et al. | |

FOREIGN PATENT DOCUMENTS

| | | |
|---|---|---|
| CN | 1930238 A | 3/2007 |
| CN | 103073831 A | 5/2013 |
| EP | 1022296 A1 | 7/2000 |
| GB | 2226322 A | 6/1990 |
| WO | 95/35335 A1 | 12/1995 |
| WO | 00/41036 A1 | 7/2000 |
| WO | 00/58380 A1 | 10/2000 |
| WO | 2006/052623 A2 | 5/2006 |

OTHER PUBLICATIONS

International Preliminary Report on Patentability in International Application No. PCT/EP2014/064411, dated Jan. 21, 2016.
International Search Report in International Application No. PCT/EP2014/064411, dated Sep. 10, 2014.
Smith et al., "Synthesis and Characterization of PS-PI and PS-PBD Random Copolymers and 'Random-Block' Copolymers Via Anionic Polymerizations," in Polymer Preprints 34(2), pp. 672-673 (1993).
Smith et al., "Styrene-Diene Random Copolymers, Blends and 'Random-Diblock' Copolymers," in Polymer Preprints 35(2), pp. 466-467 (1994).

* cited by examiner

*Primary Examiner* — Hui Chin
(74) *Attorney, Agent, or Firm* — J.A. Lindeman & Co., PLLC

(57) ABSTRACT

The present invention relates to novel block copolymers comprising at least one mono vinyl aromatic monomer (also referred to as mono vinylarene) and at least one conjugated diene monomer, in particular to styrene butadiene block copolymers (SBC), with a defined block structure. The invention further relates to polymer blends which comprise at least one block copolymer and at least one mono vinylarene acrylate copolymer, in particular a styrene-methyl methacrylate copolymer. Related methods for preparation and articles prepared from the polymer blends are also provided.

11 Claims, No Drawings

MONO VINYL AROMATIC CONJUGATED DIENE BLOCK COPOLYMER AND POLYMER COMPOSITION COMPRISING SAID BLOCK COPOLYMER AND A MONO VINYLARENE ACRYLATE COPOLYMER

The present invention relates to a novel block copolymer comprising at least one mono vinyl aromatic monomer (also referred to as mono vinylarene) and at least one conjugated diene monomer, in particular to styrene butadiene block copolymers (SBC), with a defined block structure. The invention further relates to polymer blends which comprise at least one block copolymer and at least one mono vinylarene acrylate copolymer, in particular a styrene-methyl methacrylate copolymer (SMMA). Related methods for preparation and articles prepared from the polymer blends are also provided.

Mono vinylarene conjugated diene copolymers, in particular styrene butadiene block copolymers (SBC), are known and useful for a variety of purposes. It is known to combine polystyrene with a SBC copolymer in order to achieve an impact resistant modified polystyrene. Block copolymers of styrene and butadiene are described for example in WO 2000/58380, WO 1995/35335 and U.S. Pat. No. 4,939,208.

Polymerisation of styrene and butadiene in the presence of small amounts of tetrahydrofuran as randomizer gives a high proportion of homopolybutadiene blocks and a tapered transition to the polystyrene block. If the amount of tetrahydrofuran is increased, this gives butadiene-styrene copolymer blocks with some degree of random character. However, the addition of tetrahydrofuran also sharply increases the relative proportion of 1,2-linkages in the polydiene (1,2-vinyl content). The high 1,2-vinyl content, however, impairs the thermal stability of the corresponding block copolymers and increases its glass transition temperature.

Random copolymerization of styrene and butadiene in cyclohexane in the presence of soluble potassium salts is described by S. D. Smith in Polymer Preprints 34 (2), 672 (1993) and 35 (2), 466 (1994). Suitable soluble potassium salts mentioned are e.g. potassium 2,3-dimethyl-3-pentanolate and potassium 3-ethyl-3-pentanolate.

WO 2000/58380 describes a glass-clear impact-modified polystyrene comprising a styrene butadiene copolymer (SBC) which is produced in the presence of a potassium salt and exhibit a 1,2-vinyl content below 20% by weight.

It is also known that SBC block copolymers can be blended with other polymers such as mono vinylarene acrylate copolymers, e.g. styrene methyl methacrylate copolymer (SMMA), in order to improve the mechanical properties, in particular the impact resistance. The moldings made of such SBC/SMMA polymer blends are clear, high performance products which exhibit good clarity and toughness. Said products have numerous applications, such as food container, display racks, crisper trays, and components of toys. Examples of such polymer blends of mono vinylarene conjugated diene block copolymer and a mono vinylarene acrylate copolymer are described in U.S. Pat. Nos. 4,356,190, 5,777,030, 7,776,965 and WO 2006/052623.

Examples of commercially styrene butadiene copolymers (SBC) are known under the K-Resin® trademark (Chevron Phillips Chemical Co., The Woodlands, Tex.).

The document U.S. Pat. No. 4,939,208 describes linear, transparent styrene-butadiene block copolymers of the structure S1-B1-S/B-S2. The polymerization of styrene and butadiene in the presence of a Lewis base, in particular tetrahydrofuran as randomizer, gives the tapered copolymer block of butadiene and styrene. The length of the S/B segment depends on the amount of Lewis base.

The document U.S. Pat. No. 5,777,030 describes polymer blend compositions having improved impact properties while retaining good mechanical properties. The polymer blend composition comprises (A) a mono vinyl arene/conjugated diene block copolymer in an amount ranging from about 90 to 25 weight percent and (B) a styrenic copolymer of styrene/methyl methacrylate in an amount ranging from about 10 to 75 weight percent, based on the total weight of the blend composition. Preferably, component (A) is a styrene-butadiene copolymer having a styrene content ranging from about 95 to 71 weight percent and a butadiene content ranging from about 5 to about 29 weight percent, based on the total weight of component (A).

The document U.S. Pat. No. 7,776,965 describes the preparation of a styrene-butadiene block copolymer with three tapered S/B blocks using tetrahydrofuran as randomizer. The SBC block copolymers described comprise from 30 to 40% by weight diene monomer.

WO 2006/052623 describes polymer blends of a mono vinyl arene conjugated diene block copolymer (SBC) and a mono vinylarene acrylate copolymer (SMMA) with low haze and increased modulus and impact strength. Particularly the SBC comprises 30 to 40% by weight butadiene and at least one tapered block S/B.

There is further a need to develop lower haze polymer blends of mono vinylarene conjugated diene block copolymer and mono vinylarene acrylate copolymer with good modulus and impact strength.

It is one object of the present invention to provide glass-clear impact-modified compositions of mono vinylarene conjugated diene block copolymer and mono vinylarene acrylate copolymer (in particular SBC/SMMA compositions), which have a balanced toughness/stiffness ratio and do not have the abovementioned disadvantages. In particular, the compositions should have improved optical properties, such as high clarity and transmittance and low haze. Further, the inventive mono vinylarene conjugated diene block copolymer should be isorefractive with the corresponding mono vinylarene acrylate copolymers.

It was surprisingly found that a SBC block copolymer with a defined block sequence can be used to improve the optical properties, in particular the clarity and the haze, while the improved mechanical properties, such as impact strength and tensile properties, remain good. It was found that it is advantageous to include at least one butadiene homo block and at least one randomized S/B block in the sequence of the known SBC block copolymers. Thus, the tapered blocks of the known commercial SBC (BK® resins) are replaced with at least one sequence B-S/B-S with a randomized block S/B.

The present invention is directed to a block copolymer comprising at least one mono vinyl aromatic monomer and at least one conjugated diene monomer, wherein the block copolymer comprises at least a first and a second homo block (S) of a mono vinyl aromatic monomer and, between these vinyl aromatic blocks, at least one homo block (B) of a conjugated diene and at least one random block (S/B) of at least one mono vinyl aromatic monomer and at least one conjugated diene, wherein the block copolymer comprises from 20 to 60% by weight, preferably from 20 to 50% by weight, also preferably from 30 to 40% by weight, more preferably from 35 to 38% by weight, of conjugated diene monomer, based on the total block copolymer.

In the invention, "mono vinyl aromatic conjugated diene block copolymer" means a polymer comprising two or more blocks, wherein each block comprises mono vinyl aromatic monomer units (mono vinylarene units) and/or conjugated diene monomer units. Preferably the mono vinyl aromatic conjugated diene block copolymer is a block copolymer comprising one or more mono vinyl aromatic (such as styrene) blocks and one or more conjugated diene (such as butadiene) blocks.

More preferably the vinyl aromatic conjugated diene block copolymer is a block copolymer comprising styrene blocks and butadiene blocks (also referred to as styrene butadiene copolymer, SBC).

Particularly, if a block comprises only one type of monomer units, it is termed a "homo block". In particular, if a block comprises at least 95% by weight, preferably at least 99% by weight, more preferably more than 99.5% by weight of one type of monomer units, it can be termed a "homo block". A block is a "homo block" when it substantially consists of only one kind of monomer unit. Said condition shall be true for substantially all sections of the block within the level expected by chance. This condition does not preclude the possibility of sections of the block (transition section), in particular the starting and the end section of the block, comprising also a certain amount (e.g. more than 5% by weight) of one or more different monomer units.

Particularly, if a block comprises both monomers (mono vinyl aromatic monomer units and conjugated diene monomer units) and it is not a homo block, it can be a random block, a tapered block, a stepwise block, or any other type of block.

The mono vinyl aromatic conjugated diene block copolymer of the invention comprises at least one random block (S/B) comprising at least one mono vinyl aromatic monomer and at least one conjugated diene. In terms of the present invention a block is a "random block" when the mole fraction of conjugated diene units in a section of the block is substantially the same as the mole fractions of conjugated diene units in the entire block. The same applies for the mono vinyl aromatic monomer units. This condition does not preclude the possibility of sections of the block having regularity (i.e. appearing non-random), but such regular sections will typically be present at no more than about the level expected by chance (resulting from polymerization mechanism with constantly occurring change of Li to K counterion). Particularly, a block is random when said condition is true for substantially all sections of the block.

A "mono vinyl aromatic monomer" (also referred to as mono vinylarene) according to the invention refers to an organic compound containing a single carbon-carbon double bond, at least one aromatic moiety, and in particular a total of 8 to 18 carbon atoms, preferably 8 to 12 carbon atoms. Preferably the aromatic moiety is a mono cyclic moiety, more preferably mono cyclic moiety having a 6 membered aromatic ring. In particular, the mono vinyl aromatic monomer refers to a mono vinyl mono cyclic arene monomer having 8 to 12 carbon atoms.

Suitable mono vinyl aromatic monomers are styrene, alpha-methylstyrene, 2-methylstyrene, 3-methylstyrene, 4-methylstyrene, 2-ethylstyrene, 3-ethylstyrene, 4-ethylstyrene, 4-n-propyl-styrene, 4-t-butylstyrene, 2,4-dimethylstyrene, 4-cyclohexylstyrene, 4-decylstyrene, 2-ethyl-4-benzylstyrene, 4-(4-phenyl-n-butyl) styrene, 1-vinylnaphthalene, 2-vinylnaphthalene, and mixtures thereof. In one preferred embodiment, the mono vinyl aromatic monomer is styrene. Typically, styrene is the preferred mono vinylarene monomer due to its ease of polymerization.

Generally, the mono vinyl aromatic monomer is (in total) present in the inventive block copolymer in the range from 40 to 80% by weight, based on the weight of the block copolymer. Preferably, the mono vinyl aromatic monomer is present in the block copolymer in the range of from 60 to 70% by weight, more preferably from 62 to 65% by weight, often about 64% by weight, based on the weight of the block copolymer.

A "conjugated diene," according to the invention refers to an organic compound containing at least two, preferably exactly two, conjugated carbon-carbon double bonds and in particular a total of 4 to 12 carbon atoms, preferably 4 to 8 carbon atoms. Examples of such suitable conjugated dienes include 1,3-butadiene, 2-methyl-1,3-butadiene, 2-ethyl-1,3-butadiene, 2,3-dimethyl-1,3-butadiene, 1,3-pentadiene, 3-butyl-1,3-octadiene, and mixtures thereof. In one embodiment, the conjugated diene is 1,3-butadiene or isoprene, more preferably 1,3-butadiene. The preferred diene is 1,3-butadiene, as it is most readily available.

As a rule the content of the conjugated diene monomer (e.g. butadiene) in the block copolymer (e.g. SBC) is chosen so that isorefractivity is given with the blended mono vinylarene acrylate copolymer (e.g. SMMA) and the block copolymer (e.g. SBC). This is normally required for a high transparency of the polymer composition res. the molding. The conjugated diene is generally present in the block copolymer in an amount in the range from 20 to 60% by weight, preferably from 20 to 50% by weight, based on the weight of the block copolymer. Preferably the conjugated diene is present in the block copolymer in an amount in the range of from 30 to 40% by weight, more preferably from 35 to 38% by weight, based on the weight of the block copolymer. In a preferred embodiment the conjugated diene is present in the block copolymer in an amount more or equal than 36% by weight, more preferably from 36 to 40% by weight, often from 36 to 38% by weight, often about 36% by weight, based on the total block copolymer.

In a preferred embodiment the at least one mono vinyl aromatic monomer is styrene and the at least one conjugated diene is 1,3-butadiene.

Preferably the invention is directed to a block copolymer wherein the 1,2-vinyl content of blocks comprising conjugated diene is preferably from 10 to 20%, in particular from 12 to 16%. For the purposes of the present invention, the vinyl content is the relative proportion of 1,2-linkages of the diene units based on the total of linkages (1,2; 1,4-cis and 1,4-trans linkages) in the block comprising conjugated diene.

A preferred embodiment is directed to a block copolymer comprising (or consisting of)

40 to 80% by weight, preferably 50 to 80% by weight, preferably 60 to 70% by weight, more preferably 62 to 65% by weight, most preferably about 64% by weight, based on the weight of the block copolymer, styrene, and 20 to 60% by weight, preferably 20 to 50% by weight, preferably 30 to 40% by weight, more preferably 35 to 38% by weight, most preferably about 36% by weight, based on the weight of the block copolymer, butadiene.

In a preferred embodiment the inventive block copolymer comprises at least one of the following sequences S1-S2-B1-S3/B2-S4 (sequence 1) and S2-B1-S3/B2-S4 (sequence 2), wherein S represents a homo block of mono vinyl aromatic monomer (e.g. a styrene homo block), B represents a homo block of conjugated diene (e.g. a butadiene homo block), and S/B represents a random block consisting of vinyl aromatic monomer and conjugated diene (e.g. a random styrene butadiene block). In particular the inventive block copolymer comprises the two sequences S1-S2-B1-S3/B2-S4 (sequence 1) and S2-B1-S3/B2-S4 (sequence 2) as described above.

Preferably the at least two blocks of mono vinyl aromatic monomers (first and second block) are two homo blocks S2 and S4, made of (or consisting of) a mono vinyl aromatic monomer, in particular styrene.

In particular the molar masses of the at least two homo blocks (first and second block) of a mono vinyl aromatic monomer (preferably of the homo blocks S2 and S4, more preferably of the styrene homo blocks S2 and S4) are each in the range of 1,000 to 15,000 g/mol, preferably of 3,000 to 13,000 g/mol. In a preferred embodiment the invention is directed to a block copolymer described above wherein the molar mass of the second block of a mono vinyl aromatic monomer is in the range of 1,000 to 10,000 g/mol, preferably in the range of 1,000 to 8,000 g/mol, more preferably in the range of 2,000 to 5,000 g/mol. In a further embodiment the molar mass of the first block of a mono vinyl aromatic monomer (preferably of the homo block S2, more preferably of the styrene homo block S2) is in the range of 5,000 to 15,000 g/mol, more preferably of 10,000 to 13,000 g/mol and the molar mass of the second block of a mono vinyl aromatic monomer (preferably of the homo block S4, more preferably of the styrene homo block S4) is in the range of 1,000 to 10,000 g/mol, preferably in the range of 1,000 to 8,000 g/mol, more preferably in the range of 2,000 to 5,000 g/mol.

Preferably the at least one homo block of a conjugated diene is a homo block B1 made of (or consisting of) a conjugated diene monomer, in particular butadiene.

In particular the molar mass of the at least one homo block of a conjugated diene monomer (preferably of the homo block B1, more preferably of the butadiene homo block B1) is in the range of 1,000 to 5,000 g/mol, preferably 1,000 to 3,500 g/mol, more preferably from 2,000 to 3,500 g/mol.

Preferably the at least one random block of at least one mono vinyl aromatic monomer and at least one conjugated diene is a random block (preferably S3/B2) made from (or consisting of) at least one mono vinyl aromatic monomer, in particular styrene, and at least one conjugated diene, in particular butadiene.

Preferably, the molar mass of the at least one random block of the at least one mono vinyl aromatic monomer and the at least one conjugated diene (preferably of the random block S3/B2, more preferably of the styrene-butadiene random block S3/B2) is in the range from 15,000 to 30,000 g/mol, preferably from 20,000 to 25,000 g/mol. The molar mass of the mono vinyl aromatic monomer in the at least one random block (S3/B2) can be in the range from 5,000 to 8,000 g/mol. The molar mass of the conjugated diene monomer in the at least one random block (S3/B2) can be within the range from 10,000 to 20,000 g/mol, more preferably from 15,000 to 18,000 g/mol.

In particular the mono vinyl aromatic monomer is present in the at least one random block (S3/B2) in an amount of 10 to 50% by weight, based on the total of random block, more preferable of 20 to 40% by weight, most preferable of 25 to 30% by weight, also preferably 25 to 28% by weight. In particular the conjugated diene monomer is present in the at least one random block (S3/B2) in an amount of 50 to 90% by weight, based on the total of random block, more preferable of 60 to 80% by weight, most preferable of 70 to 75% by weight, also preferably 72 to 75% by weight.

In a preferred embodiment the at least one random block (S/B) comprises (or consists of)
60 to 80% by weight, more preferable of 70 to 75% by weight, most preferably 72 to 75% by weight, based on the total of random block, of conjugated diene monomer, preferably 1,3-butadien; and
20 to 40% by weight, more preferable of 25 to 30% by weight, most preferably 25 to 28% by weight, based on the total of random block, of mono vinyl aromatic monomer, preferably styrene.

Preferably the molar ratio of the mono vinyl aromatic monomer to the conjugated diene monomer in the at least one random block (preferably in the random block S3/B2, more preferably the random block S3/B2 made from (or consisting of) styrene and butadiene) is in the range of 0.1 to 0.5, preferably of 0.1 to 0.4, more preferably of 0.1 to 0.3, most preferably of 0.15 to 0.25.

The at least one random block (S3/B2) is preferably present in an amount of 20 to 50% by weight, based on the total block copolymer, preferably from 40 to 50% by weight.

A preferred embodiment of the invention relates to a block copolymer (e.g. a SBC) as described above, wherein the block copolymer has a star-shaped structure. A star-shaped structure in terms of the present invention is a structure comprising at least one, preferably at least two branches, preferably coupled via an linking agent, wherein each branch may have the structure of a block copolymer as described above. More preferably a star-shaped block structure in terms of the present invention is a structure comprising 1 to 8, preferably 2 to 8, preferably 2 to 5, more preferably 3 to 4, branches with the same or different sequences coupled via a linking agent, wherein each branch may have the structure of a block copolymer as described above.

Further, a star-shaped structure block copolymer in terms of the present invention is a block copolymer which can be obtained (or is obtained) by forming branches of the copolymer by sequential polymerization and after that coupling the branches by addition of a suitable coupling agent, e.g. by a polyfunctional (di- or multi-functional) coupling agent. Suitable coupling agents are known to those skilled in the art and described later. The process for preparation of the inventive block copolymers is described below. As a skilled person knows it will be possible that some of the active polymer chains become terminated rather than reacting with the coupling agent.

In terms of the present invention, a block copolymer having star-shaped structure may also be a product mixture comprising star shaped structure polymers and terminated single chains.

Preferably the block copolymer (SBC) has a star-shaped structure comprising at least one branch with the block sequence S1-S2-B1-S3/B2-S4 (sequence 1) and/or S2-B1-S3/B2-S4 (sequence 2), wherein S represents homo blocks of mono vinyl aromatic monomer (e.g. a styrene homo block), B represents homo blocks of conjugated diene (e.g. a butadiene homo block), and S/B represents a random block consisting of vinyl aromatic monomer and conjugated diene.

In one preferred embodiment the invention is directed to a block copolymer as described above, wherein the block copolymer has a star-shaped structure having at least one branch of the star with the block sequence
(i) S2-B1-S3/B2-S4
and one branch of the star with the block sequence
(ii) S1-S2-B1-S3/B2-S4,
wherein S represents a homo block of mono vinyl aromatic monomer, B represents a homo block of conjugated diene, and S/B represents a random block consisting of vinyl aromatic monomer and conjugated diene.

In another preferred embodiment the invention is directed to a block copolymer as described above, wherein the block copolymer has a star-shaped structure having at least one branch of the star with the block sequence (i) S2-B1-S3/B2-S4, and one branch of the star with the block sequence (ii) S1-S2-B1-S3/B2-S4, wherein S, B and S/B are as defined above, and wherein the molar ratio of the branch with block sequence S2-B1-S3/B2-S4 to the branch with the block sequence S1-S2-B1-S3/B2-S4 is in the range from 4:1 to 2:1, preferably the molar ratio is 2.3:1.

Preferably the inventive block copolymer is a star shaped block copolymer prepared by forming and coupling the following polymer chain structures

1 S1-S2-B1-S3/B2-S4 X
2,3 S2-B1-S3/B2-S4 X wherein S, B and S/B are as defined above, and X represents a coupling agent.

Generally, each block is formed by polymerizing the monomer or mixture of monomers from which the desired units of the block are derived (sequential anionic polymerization). The polymerization process described later will generally apply to the formation of all types of blocks in the inventive block copolymer.

Further, the present invention is directed to a block copolymer as described above, wherein the block copolymer is obtainable (or is obtained) by a process which comprises the step of forming the block copolymer by sequential anionic polymerization, where at least the polymerization step of the at least one random block (S/B) takes place in the presence of a potassium salt as randomizer.

Further, the present invention is directed to a block copolymer as described above, wherein the copolymer has a star shaped structure, and wherein the block copolymer is obtainable (or is obtained) by a process that comprises the steps of forming the block copolymer by sequential anionic polymerization, where at least the polymerization step of the at least one random block takes place in the presence of a potassium salt as randomizer and after that coupling the branches by addition of a suitable coupling agent, in particular a polyfunctional (di- or multi-functional) coupling agent. Suitable coupling agents are described later in connection with the inventive process for forming the block copolymer.

Preferably the invention is directed to a block copolymer as described above, wherein the copolymer has a star shaped structure, and wherein the block copolymer is obtainable (or is obtained) by a process that comprises the steps of forming by sequential anionic polymerization and coupling at least one branch with the block sequence S1-S2-B1-S3/B2-S4 (sequence 1) and/or S2-B1-S3/B2-S4 (Sequence 2), wherein S represents homo blocks of mono vinyl aromatic monomer (e.g. a styrene homo block), B represents homo blocks of conjugated diene (e.g. a butadiene homo block), and S/B represents a random block consisting of vinyl aromatic monomer and conjugated diene, where at least the polymerization step of the random block S/B takes place in the presence of a potassium salt as randomizer.

Polymer Composition

The present invention also is directed to a polymer composition comprising a block copolymer, which comprises at least one mono vinyl aromatic monomer and at least one conjugated diene monomer, as described above, and at least one mono vinylarene acrylate copolymer, wherein the polymer composition comprises from 6 to 31% by weight, preferably from 10 to 20% by weight, based on the total composition, of conjugated diene (units). A preferred embodiment is directed to a polymer composition comprising from 12 to 15% by weight, based on the total composition, of conjugated diene (units).

The preferred embodiments described in connection with the block copolymer also apply to the inventive polymer composition comprising said block copolymer.

The mono vinylarene acrylate copolymer can be prepared by copolymerizing at least one mono vinyl aromatic monomer as described above, preferably styrene, alpha-methylstyrene, o-, m- or p-vinyltoluene, 2,4-dimethylstyrene, 2,4-diethylstyrene, 2-chlorostyrene, 2-chloro-5-methylstyrene, vinylnaphthalene or mixtures thereof, with at least one substituted or unsubstituted alkyl acrylate, preferably selected from methylacrylate, ethylacrylate, isopropylacrylate, butylacrylate, methyl methacrylate, ethyl methacrylate, butyl methacrylate, hexyl methacrylate, cylohexyl methacrylate, methyl ethacrylate, and the like, or mixtures thereof.

In a preferred embodiment the at least one mono vinylarene acrylate copolymer is a styrene methyl methacrylate copolymer (SMMA). In particular commercial available SMMA can be used, such as NAS® types from Styrolution, such as NAS®30, NAS® 90, and NAS® 21.

The inventive block copolymer (mono vinyl aromatic conjugated diene block copolymer) is typically present in the polymer composition in an amount in the range of 20 to 50% by weight, preferably 30 to 40% by weight, more preferably 35 to 38% by weight, most preferably about 36% by weight, based on the total polymer composition.

The mono vinylarene acrylate copolymer is typically present in an amount in the range of 50 to 80% by weight, preferably 60 to 70% by weight, more preferably 62 to 65% by weight, most preferably about 64% by weight, based on the total polymer composition.

The ratio of the vinyl aromatic conjugated diene block copolymer and the mono vinylarene acrylate copolymer can be chosen depending on the mechanical properties desired. Insufficient amounts of the vinyl aromatic conjugated diene block copolymer could result in the polymer blend composition not exhibiting impact, and insufficient amounts of the mono vinylarene acrylate copolymer could result in the polymer blend composition not exhibiting desired stiffness.

The polymer composition can also contain commonly known additives such as stabilizers; antioxidants; anti-blocking agents, such as erucic acid amide, stearic acid amide; mold release agents; flow improvement additives, such as white oil or mineral oil; extenders; dyes; pigments; flame-retardants; fillers; reinforcing agents (e.g. glass fibers). Typically, the additives may be present in an amount from 0 to 5% by weight, preferably from 0 to 2% by weight, more preferably from 0 to 1% by weight, often from 10 to 10,000 ppm, based on the total polymer composition.

In a preferred embodiment the polymer composition as described above comprises from 6 to 31% by weight, preferably from 10 to 20% by weight, most preferably from 12 to 15% by weight, based on the total polymer composition, of the at least one conjugated diene (e.g. butadiene). Preferably the polymer composition comprises equal or less than 20% by weight of conjugated diene monomer, based on the total polymer composition.

Typically, the polymer composition as described above comprises from 54 to 73% by weight, preferably from 62 to 70% by weight, most preferably from 66.5 to 68% by weight, based on the total polymer composition, of the at least one mono vinyl aromatic monomer (e.g. styrene). Typically the polymer composition, as described above, comprises from 15 to 21% by weight, preferably from 18 to 20% by weight, most preferably from 18.5 to 20% by weight, based on the total polymer composition, of the at least one acrylate monomer (e.g. methyl methacrylate).

In a preferred embodiment the polymer composition comprises (or is consisting of) the following monomer units:

10 to 20% by weight, preferably from 12 to 15% by weight, most preferably about 13.2% by weight, based on the total polymer composition, of the at least one conjugated diene (e.g. butadiene);

62 to 70% by weight, most preferably from 66.5 to 68% by weight, most preferably about 67.7% by weight, based on the total polymer composition, of the at least one mono vinyl aromatic monomer (e.g. styrene);

18 to 20% by weight, most preferably from 18.5 to 20% by weight, most preferably about 19.2% by weight, also preferably about 19.1% by weight, based on the total polymer composition, of the at least one acrylate monomer (e.g. methyl methacrylate).

The polymer compositions (respectively the articles, e.g. moldings, made of the inventive polymer composition) exhibit a clarity of more than 90%, in particular up to 99%. The clarity can be defined as the part of the light that is scattered by the polymer sample by an angle less than 2.5° with regard to the incoming light beam. The vinyl aromatic-conjugated diene block copolymer is selected or prepared such that it has a melt flow rate from 3.0 to 12 g/10 minutes, more preferably from about 3.0 to 10 g/10 minutes.

Process for Preparing the Block Copolymers

Further, the present invention is directed to a process for preparing a block copolymer as described above (mono vinyl aromatic conjugated diene block copolymer), which comprises the step of forming the block copolymers by sequential anionic polymerization, where at least the polymerization step of the at least one random block takes place in the presence of a potassium salt as randomizer; preferably in the presence of a randomizer selected from potassium alcoholate of a tertiary alcohol having at least 7 carbon atoms, for example selected from potassium-2-methyl-butanolate, potassium 2,3-dimethyl-3-pentanolate, potassium 3,7-dimethyl-3-octanolate, and potassium 3-ethyl-3-pentanolate, most preferably potassium 2-methyl-butanolate (KTA). Preferably the at least one random block can be prepared by adding the monomer mixture in two or more portions, in particular in 2 to 5 portions.

The preferred embodiments described above in connection with the block copolymer also apply to the inventive process for preparing a block copolymer.

Generally, each block is formed by polymerizing the monomer or the mixture of monomers from which the desired units of the block are derived. Typically the monomer or the mixture of monomers can be added in one or more portions in one polymerization step, in particular in 2 to 5 portions. In particular the reaction and the heat production of the polymerization step can be controlled by adding the monomer or the monomer mixture in two or more portions. The polymerization process will generally apply to the formation of all types of blocks in the inventive polymer. The general procedure of the sequential anionic polymerization is for example described in WO 2000/58380.

Preferably the process for preparing inventive block copolymers as described above (mono vinyl aromatic conjugated diene block copolymer) comprises sequentially contacting under polymerization conditions of at least one mono vinyl aromatic monomer, an organomonoalkali metal initiator, at least one conjugated diene monomer, and thereafter optionally coupling with a polyfunctional coupling agent to form a star shaped block copolymer.

The inventive block copolymers may, for example, be formed by sequential anionic polymerization, where at least the polymerization of the blocks (S/B) takes place in the presence of a potassium salt. Typically, the inventive block copolymers may be formed by sequential anionic polymerization, where at least the polymerization of the at least one random block, in particular the block (S/B), takes place in the presence of a potassium salt as randomizer and in the presence of an anionic polymerization initiator, e.g. an organo monoalkali metal initiator. The potassium salt is generally used in a molar deficiency, based on the anionic polymerization initiator. Preferably the molar ratio of anionic polymerization initiator to potassium salt is from 10:1 to 100:1, particular preferably from 30:1 to 70:1. In a preferred embodiment the molar ratio of anionic polymerization initiator to potassium salt is from 10:1 to 100:1, particular preferably from 30:1 to 70:1, in the sequential anionic polymerization. Preferably at least the polymerization of the at least one random block, in particular the block (S/B), takes place in the presence of a potassium salt as randomizer and in the presence of an anionic polymerization initiator, wherein the molar ratio of anionic polymerization initiator to potassium salt is from 10:1 to 100:1, particular preferably from 30:1 to 70:1.

The potassium salt used should generally be soluble in the reaction medium. Examples of suitable potassium salts are potassium alcoholates, in particular a potassium alcoholate of a tertiary alcohol having at least 7 carbon atoms. Particular preference is given to use of potassium 2-methylbutanolate, potassium 2,3-dimethyl-3-pentanolate, potassium 2-methylhexanolate, potassium 3,7-dimethyl-3-octanolate (potassium tetrahydrolinaloolate) or potassium 3-ethyl-3-pentanolate. The potassium alcoholates are obtainable, for example, by reacting elemental potassium, potassium/sodium alloy or potassium alkylates with the appropriate alcohols in an inert solvent.

It is useful for the potassium salt not to be added to the reaction mixture until the anionic polymerization initiator has been added. In this way hydrolysis of the potassium salt by traces of aprotic contaminants can be avoided. The potassium salt is particularly preferably added just prior to polymerization of the random block S/B.

The polymerization process may be performed in the presence of an initiator, in particular an anionic polymerization initiator. Anionic polymerization initiators which may be used are the usual mono-bi- or multifunctional alkali metal alkyl compounds, alkali metal aryl compounds or alkali metal aralkyl compounds. The initiator may be an organo monoalkali metal compound that is a known initiator. The initiator may have the formula RM, where R is an alkyl, cycloalkyl, or aryl radical containing 4 to 8 carbon atoms, such as an n-butyl radical, and M is an alkali metal, such as lithium. Preferred initiators are n-butyl lithium, sec-butyl lithium, and t-butyl lithium. It is advantageous to use organolithium compounds, such as ethyl-, propyl-, isopropyl-, n-butyl-, sec-butyl-, tert-butyl-, phenyl-, diphenylhexyl-, hexamethyldi-, butadienyl-, isopropyl- or polystyryllithium, 1,4-dilithiobutane 1,4-dilithio-2-butane or 1,4-dilithiobenzene. Preferably n-butyl lithium (BuLi) is used as anionic polymerization initiator.

The amount of polymerization initiator needed depends on the desired molar weight, as is known in the art, and is readily determinable, making due allowances for traces of reaction poisons in the feed streams. Generally the polymerization initiator is used in an amount from 0.001 to 5 mol %, based on the total amount of monomers.

The polymerization process for preparing the inventive vinyl aromatic-conjugated diene block copolymer may be carried out in the presence of a solvent, e.g. a hydrocarbon solvent at any suitable temperature in a range of −100° C. to 150° C., preferably in the range of 0° C. to 150° C., and at a pressure sufficient to maintain the reaction mixture substantially in the liquid phase. Suitable solvents are those aliphatic, cycloaliphatic or aromatic hydrocarbons which have from 4 to 12 carbon atoms and are usual for anionic polymerization, such as pentane, hexane, heptane, cyclohexane, methylcyclohexane, iso-octane, benzene, alkylbenzenes, such as toluene, xylene or ethylbenzene, or decalin or appropriate mixtures. Preference is given to cyclohexane and methylcyclohexane. Preferred solvents include linear and cycloparaffins, such as pentane, hexane, octane, cyclohexane, cyclopentane, and mixtures thereof. Cyclohexane is preferred. The polymerization process may be carried out in the substantial absence of oxygen and water, such as under an inert gas atmosphere.

The polymerization may also be carried out without solvent in the presence of organyl metal compounds which slow down the rate of polymerization, such as alkylmagnesium compounds, alkylaluminum compounds or alkyl zinc compounds.

Once the polymerization has ended the living polymer chains may be capped using a chain terminator. Suitable chain terminators are protonating substances or Lewis acids, such as water, alcohols, aliphatic or aromatic carboxylic acids, or also inorganic acids, such as carbonic acid or boric acid.

Instead of adding a chain terminator once the polymerization has ended, the living polymer chains may also be linked to give a star shaped block copolymer by polyfunctional coupling agents, such as polyfunctional aldehydes, ketones, esters, anhydrides or epoxides. Preferably the polyfunctional coupling agents have averaged 2 to 6, preferably 2 to 4 functional groups in the molecule.

Symmetrical or asymmetrical star shaped block copolymers whose arms may have the above mentioned block structures may be obtained here by coupling identical or different blocks. Asymmetrical star block copolymers are obtainable, for example, by preparing the individual arms of the star separately and/or by initiating more than once, for example initiating twice with the initiator divided in a ratio of from 1:2 to 10:1, preferably in a ratio of 1:2.3. A coupling agent can be added after polymerization is complete. Suitable coupling agents are known to those skilled in the art. These include di- or multi-vinylarene compounds; alkoxytin compounds; di- or multi-halides, such as silicon halides and halosilanes; di- or multiesters, such as the esters of monoalcohols with polycarboxylic acids; diesters which are esters of monobasic acids with polyalcohols such as glycerol; and mixtures of two or more such compounds. A useful multifunctional coupling agent includes epoxidized soybean oil.

Following completion of the coupling reaction, the polymerization reaction mixture can be treated with a terminating agent such as water, carbon dioxide, alcohol, phenols, or linear saturated aliphatic mono- or di-carboxylic acids, to remove alkali metal from the block copolymer or for color control.

After termination, the polymer composition, in particular the primary polymerization product, (e.g. the polymer in polymerization solvent) usually contains 10 to 40 weight percent solids. The polymer cement, in particular the polymer composition, can be flashed to evaporate the solvent so as to increase the solids content to between 50 and 99 weight percent, followed by vacuum oven or devolatilizing extruder drying to remove the remaining solvent and to form pellets.

In an further aspect, the present invention is directed to a block copolymer which is obtainable (or is obtained) by a process as described above.

Preparation of the polymer Blends (polymer Compositions)

In a further aspect the present invention is directed to a process for preparing a polymer composition as described above (polymer composition comprising a mono vinyl aromatic conjugated diene block copolymer and a vinylarene acrylate copolymer) comprising the step of mixing the polymer components and optionally additives.

Preferably, further commonly known additives can be used, in particular additives selected from stabilizers; antioxidants; anti-blocking agents; mold release agents, such as erucic acid amide, stearic acid amide; flow improvement additives, such as white oil (mineral oil); extenders; dyes; pigments; flame-retardants; fillers; reinforcing agents (e.g. glass fibers).

The preferred embodiments described in connection with the block copolymer and the polymer composition also apply to the inventive process for preparing a polymer composition.

Typically, adequate mixing of the polymer components of the polymer composition of the invention can be achieved by mechanical mixing, preferably using a single screw or twin screw extruder. Operation of an extruder to achieve this end is within the purview of a person skilled in the art. For example, for an inch and a half extruder having an L to D ratio of about 30:1, the extruder is preferably operated from 75 to 125 rpm. During such operation, the barrel temperature of the extruder is in particular in the range of from 200 to 250° C., preferably from 215 to 235° C.

The components of the polymer composition may be individually fed to the extruder. Alternatively, they may be mixed together and then fed to the extruder, or mixed together and then extruded, and then optionally chopped into pellets. However, the components of the polymer composition of the present invention may also be dry-blended, for example in a tumble blender. Said dry-blended polymer compositions can be used directly in a process for the production of articles, e.g. by extrusion, injection molding or blow molding. Further said dry-blended polymer composition can be extruded and the extruded polymer composition can be used in a process for the production of articles, e.g. by extrusion, injection molding or blow molding.

The polymer composition of the present invention can be used for the production of articles, e.g. moldings or foils, optionally by adding known additives, such as stabilizers; antioxidants; anti-blocking agents, such as erucic acid amide, stearic acid amide; mold release agents; flow improvement additives, such as white oil (mineral oil); extenders; dyes; pigments; flame-retardants; fillers; reinforcing agents (e.g. glass fibers). Typically the articles can be produced by extrusion, injection molding or blow molding.

In an alternative procedure, the polymers may be fed directly to an extruder using loss-in-weight feeders for accurate composition control. As is common for twin screw extrusion, some of the polymers may be accurately metered into the extruder downstream of the main feed zone.

Furthermore, the present invention relates to a molding comprising (or made of) a polymer composition as described above. The molding can be used in various fields of applications of transparent, in particular highly transparent polymer articles, e.g. the moldings, can be a food container, display racks, crisper trays, and components of toys.

Furthermore, the present invention relates to the use of a polymer composition as described above for the production of household items, electronic components, household equipment, garden equipment, medical-technology equipment, motor-vehicle components, and bodywork parts. In particular the polymer composition as described above can be used for the production of food container. In particular the polymer composition as described above can be used for the production of highly transparent objects (e.g. moldings, foils).

The following examples and claims further illustrate the invention.

EXAMPLE I

Preparation of Styrene Butadiene Block Copolymers (SBC)

Examples 1 To 5

Linear styrene butadiene block copolymers (SBC) of the structure S1-S2-B1-(S3/B2)$_1$-(S3/B2)$_2$-(S3/B2)$_3$-S4 (polymer chain 1) and S2-B1-(S3/B2)$_1$-(S3/B2)$_2$-(S3/B2)$_3$-S4 (polymer chain 2) were obtained by sequential anionic polymerization of styrene and butadiene in cyclohexane as solvent at from 60 to 90° C. The ratio of the initiator BuLi (BuLi1) of polymer chain 1 to initiator BuLi (BuLi2) of polymer chain 2 was 1:2.3. The polymer chains 1 and 2 were coupled using Dehysol D82. Thus, the following SBC block copolymer was obtained:

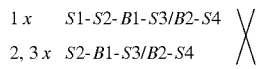

1 x  S1-S2-B1-S3/B2-S4
2, 3 x  S2-B1-S3/B2-S4

In the following the sequential polymerization of the blocks of the SBC block copolymers is described in detail (Example 5):

S1: 4786 ml of cyclohexane and 6.7 ml (9.39 mmol) of a 1.4 molar sec-butyllithium solution (in n-hexane/cyclohexane) (BuLi1) as initiator were initially charged in a stirred reactor. The mixture had been titrated at 50° C. with about further 1.6 ml of 1.4 molar sec-butyllithium solution until a light red color appeared. The amount of 321.28 g (354 ml) styrene required to prepare the block S1 was metered in. The maximum temperature was 72.2° C. Sample 1 was taken (solid content 7.92%).

S2: After all of the styrene had been consumed 15.4 ml (21.60 mmol) of a 1.4 molar sec-butyllithium solution (in n-hexane/cyclohexane) (BuLi2) and the amount of 379.04 g (418 ml) styrene required to prepare the block S2 was metered in. The maximum temperature was 74.9° C. Sample 2 was taken (solid content 15.80%).

B1: After all of the styrene had been consumed an amount of 80 g (122 ml) butadiene required to prepare block B1 was added. The maximum temperature was 74.9° C. Sample 3 was taken (solid content 17.29%).

S3/B2: After all of the butadiene had been consumed, 2.89 ml of potassium tert-amylate (KTA, potassium-2-methyl-butanolate) (solution of KTA with concentration of 5.76%/0,357 molar) was added as randomizer and three blocks S3/B2 were attached by adding three times a mixtures of 65.92 g (72.7 ml) styrene and 168.5 g (257 ml) butadiene. After each addition the polymerization was carried out at a maximum temperature of 79.3° C. The molar ratio of initiator/randomizer (Li/K) was 30/1. Sample 4 was taken (solid content 28.44%).

S4: Finally the styrene block S4 was polymerized by addition of 116.16 g (128 ml) styrene. The maximum temperature was 71° C. Sample 5 was taken (solid content 30%).

Coupling: The copolymers branches S1-S2-B1-(S3/B2)$_1$-(S3/B2)$_2$-(S3/B2)$_3$-S4 (polymer branch 1) and S2-B1-(S3/B2)$_1$-(S3/B2)$_2$-(S3/B2)$_3$-S4 (polymer branch 2) are coupled by adding Dehysol D82. The mixture was allowed to react under slow agitation for ten minutes.

Finally the reaction mixture was terminated using isopropanol and acidified using 1% by weight $CO_2$ and 0.5% by weight water. Irganox 1010 and Sumilizer GS were added in an amount of 0.2% by weight based on the polymer composition for stabilization.

In all examples 1 to 5 the ratio of BuLi1:BuLi2 was 1:2.3 and the ratio of BuLi to randomizer KTA was 30:1.

Examples 1 to 5 were carried out as described above using slightly different amounts of styrene and butadiene. The molar masses $M_n$ and weight percent of the different blocks are summarized in Table 1.

TABLE 1

| | \multicolumn{10}{c}{SBC block copolymers with random S/B-block} |
| --- | --- | --- | --- | --- | --- | --- | --- | --- | --- | --- |
| | Ex. 1 | | Ex. 2 | | Ex. 3 | | Ex. 4 | | Ex. 5 | |
| | M [g/mol] | wt-% | M [g/mol] | wt-% | M [g/mol] | wt-% | M [g/mol] | wt-% | M [g/mol] | wt-% |
| S1 | 33,186 | 44.4 | 33,186 | 44.4 | 33,697 | 44.9 | 33697 | 44.9 | 34208 | 45.3 |
| S2 | 11,504 | 15.3 | 11,504 | 15.4 | 11,865 | 15.8 | 11875 | 15.8 | 12237 | 16.2 |
| B1 | 3,096 | 4.1 | 2,580 | 3.5 | 3,096 | 4.1 | 2580 | 3.4 | 2580 | 3.4 |
| S3 of S3B2 | 6,096 | 8.2 | 7,023 | 9.4 | 6,096 | 8.1 | 6714 | 8.9 | 6387 | 8.5 |
| B2 of S3B2 | 15,795 | 21.1 | 16,305 | 21.8 | 15,795 | 21.0 | 16305 | 21.7 | 16305 | 21.6 |
| S4 | 5,058 | 6.8 | 41,29 | 5.5 | 4,545 | 6.1 | 3941 | 5.3 | 3750 | 5.0 |
| Branch 1 | 74,735 | | 74,727 | | 75,094 | | 75112 | | 75467 | |
| Branch 2 | 41,549 | | 41,541 | | 41,397 | | 41,415 | | 41,259 | |
| Block copolymer | 170,298 | | 170,271 | | 170,307 | | 170,367 | | 170,363 | |

The calculated values of the molecular weights of the blocks were verified by GPC and melt flow index. The molecular weights of the synthesized SBC block copolymers were analyzed after each polymerization sequence using gel permeation chromatography (GPC) on polystyrene gel columns (Polymer Labs, mixed B type) with monodisperse polystyrene standards at room temperature using tetrahydrofuran as eluent.

The data concerning the pure SBC block copolymers are summarized in Table 2.

TABLE 2

Physical data of pure SBC block copolymer

|  | Ex. 1 | Ex. 1a | Ex. 2 | Ex. 3 | Ex. 4 | Ex. 5 |
|---|---|---|---|---|---|---|
| Melt flow rate [g/10 min] | 11.58 | 7.24 | 35.46 | 15.78 | 8.8 | 7.88 |
| Mw [kDalton] | 115.3 | 175.9 | 124.5 | 142.4 | 171.3 | 178.5 |
| Refractive Index | — | 1.568 | 1.568 | 1.567 | 1.561 | 1.567 |
| Lower Tg [° C.] | −67.6 | −65.5 | −64.4 | −65.1 | −64.2 | −66.1 |
| Upper Tg [° C.] | 83.8 | 85.9 | 85.8 | 95.3 | 98.1 | 88.4 |

EXAMPLE II

Preparation of the SMMA/SBC Polymer Blends

The obtained SBC block copolymers according to Example 5 were degassed using a twin screw extruder ZSK 25.

36% by weight of the SBC according to Example 5 were mixed with 64% by weight of a pelletized styrene methyl methacrylate (SMMA) product (NAS®30 of Styrolution). For that purpose pellets of the SBC block copolymer and pellets of the SMMA polymer components were first mixed in a tumble blender along with 1200 ppm by weight of processing stabilizers. The resulting blend was then fed into a single screw extruder with a 1.5 inch diameter and L to D ratio of 30:1. Barrel temperatures ranged from 218 to 232° C. Polymer exited the extruder through a strand die, then a water bath to cool the polymer alloy, before finally cutting the cooled strands into cylindrical pellets.

As control sample a polymer blend using the commercial available SBC product BK19® and NAS® 30 was used. Said commercial SBC is a styrene butadiene copolymer comprising 30 to 40 wt-% of butadiene and encompass at least one tapered block. Said SBC product and the SBC/SMMA blend are described for example in WO2006/052623. The formulations are summarized in Table 3.

TABLE 3

SMMA/SBC polymer blends compositions

| [wt-%] | Control sample | Example P5 |
|---|---|---|
| SMMA_NAS ® 30 | 63.8 | 63.8 |
| BK19 ® | 36.1 |  |
| SBC/Ex. 5 |  | 36.1 |
| Irganox 1076 | 0.09 | 0.09 |
| Sumilizer GS | 0.03 | 0.03 |

EXAMPLE III

Physical Data of the Polymer Blends

The melt flow rate, the mechanical properties and the optical properties were determined as described above. Analytical and mechanical data on injection-molded specimen of the examples 1 to 5 and control examples are summarized in the following Table 4.

TABLE 4

Properties of SMMA/SBC polymer blends

|  | Control sample | Example P5 |
|---|---|---|
| Melt flow rate [g/10 min] | 5.20 | 5.27 |
| Vicat softening point [° C.] | 99.0 | 98.5 |
| Tensile modulus with extensiometer [MPa] | 2.151 | 1.984 |
| Tensile stress at yield with extensiometer [MPa] | 28.0 | 26.9 |
| Tensile strain at yield with extensiometer [%] | 4.3 | 4.3 |
| Tensile stress at break without extensiometer [MPa] | 26.4 | 26.6 |
| Tensile strain at break without extensiometer [%] | 34.1 | 41.8 |
| Pellet L* | 84.4 | 79.1 |
| Pellet a* | −0.80 | −1.11 |
| Pellet b* | 1.29 | 5.33 |
| Clarity [%] | 98.4 | 99.1 |
| Haze [%] | 2.39 | 1.57 |
| Transmittance [%] | 91.13 | 91.5 |

It is shown that the inventive injection-molded specimen (Example P5) show better transmittance and lower haze in comparison to the control sample comprising the commercial SBC product BK19®. Further sufficient mechanical properties of the SBC/SMMA specimen, such as tensile modulus and tensile strain can be achieved by using the inventive SBC.

EXAMPLE IV

Test Methods

The test physical and optical tests, which were used in order to characterize the SBC block copolymer and the polymer blends, were performed as follows:

| Test | Identification |
|---|---|
| Melt Flow Rate | ASTM D-1238 |
| Vicat Softening Point | ASTM D-1525 |
| Tensile Properties | ASTM D-638 |
| Transmittance; Haze | ASTM D-1003 |

The properties clarity, haze and transmittance were determined using haze-gard plus (BYK Gardner GmbH) (illuminate CIE-C). The clarity was determined on basis of ASTM D-1044.

The invention claimed is:
1. A block copolymer comprising at least one mono vinyl aromatic monomer and at least one conjugated diene monomer,
wherein the block copolymer comprises at least a first and a second homo block of a mono vinyl aromatic monomer and, between these vinyl aromatic blocks, at least one homo block of a conjugated diene and at least one random block of at least one mono vinyl aromatic monomer and at least one conjugated diene, wherein the block copolymer comprises from 20 to 50% by weight of conjugated diene monomer, based on the total block copolymer, wherein the block copolymer has a star shaped structure and wherein the block copolymer is obtained by a process that comprises the steps of forming by sequential anionic polymerization and coupling at least one branch with the block sequence S1-S2-B1-S3/B2-S4 and/or S2-B1-S3/B2-S4, wherein S represents homo blocks of mono vinyl aromatic monomer, B represents homo blocks of conjugated diene, and S/B represents a random block consisting of vinyl aromatic monomer and conjugated diene, where at least the polymerization step of the random block S/B takes place in the presence of a potassium salt as randomizer.

2. The block copolymer according to claim 1, wherein the at least one mono vinyl aromatic monomer is styrene and the at least one conjugated diene is 1,3-butadiene.

3. The block copolymer according to claim 1, wherein the molar mass of the at least one homo block of a conjugated diene monomer is in the range of 1,000 to 3,500 g/mol.

4. The block copolymer according to claim 1, wherein the molar mass of the second block of a mono vinyl aromatic monomer is in the range of 1,000 to 10,000 g/mol.

5. A polymer composition comprising a block copolymer, which comprises at least one mono vinyl aromatic monomer and at least one conjugated diene monomer according to claim 1 and at least one mono vinylarene acrylate copolymer, wherein the polymer composition comprises from 6 to 31% by weight, based on the total composition, of conjugated diene units.

6. The polymer composition according to claim 5 wherein the polymer composition comprises from 12 to 15% by weight, based on the total composition, of conjugated diene units.

7. The polymer composition according to claim 5, wherein the at least one mono vinylarene acrylate copolymer is a styrene methyl methacrylate copolymer.

8. The process for preparing a block copolymer according to claim 1, wherein in the sequential anionic polymerization the molar ratio of anionic polymerization initiator to potassium salt is from 10:1 to 100:1.

9. A process for preparing a polymer composition according to claim 7 comprising the step of mixing the polymer components and optionally additives.

10. A molding comprising a polymer composition according to claim 5.

11. The molding according to claim 10, wherein the molding is selected from household items, electronic components, household equipment, garden equipment, medical-technology equipment, motor-vehicle components, and bodywork parts.

* * * * *